United States Patent [19]

Swearingen

[11] 3,831,381
[45] Aug. 27, 1974

[54] LUBRICATING AND SEALING SYSTEM FOR A ROTARY POWER PLANT

[76] Inventor: Judson S. Swearingen, 2235 Carmelina Ave., Los Angeles, Calif. 90064

[22] Filed: May 2, 1973

[21] Appl. No.: 356,580

[52] U.S. Cl............................ 60/657, 60/671, 184/6, 277/15
[51] Int. Cl............................................ F01m 9/00
[58] Field of Search ............ 184/6; 277/15; 60/657, 60/671

[56] References Cited
UNITED STATES PATENTS

| | | | |
|---|---|---|---|
| 2,608,380 | 8/1952 | Rice | 277/15 X |
| 3,392,804 | 7/1968 | La Fleur | 184/6 |
| 3,452,839 | 7/1969 | Swearingen | 184/6 |
| 3,495,840 | 2/1970 | Wilk | 184/6 X |
| 3,498,620 | 3/1970 | Wiese | 184/6 X |
| 3,508,758 | 4/1970 | Strub | 277/15 |

*Primary Examiner*—Edgar W. Geoghegan
*Assistant Examiner*—Allen M. Ostrager
*Attorney, Agent, or Firm*—Ralph R. Browning

[57] ABSTRACT

In a power system including a shaft driven by expanding a working fluid in a turboexpander and a housing surrounding the shaft and the rotor of the turboexpander, a seal is provided between a process zone containing the rotor and a lubricant zone by injecting a seal fluid into the housing between the two zones at a relatively high pressure. The seal fluid is preferably comprised of the lightest constituent of the working fluid, and the system includes means for recovering the seal fluid from the lubricant and from the working fluid and recycling it.

19 Claims, 1 Drawing Figure

PATENTED AUG 27 1974　　　　　　　　　　　3,831,381
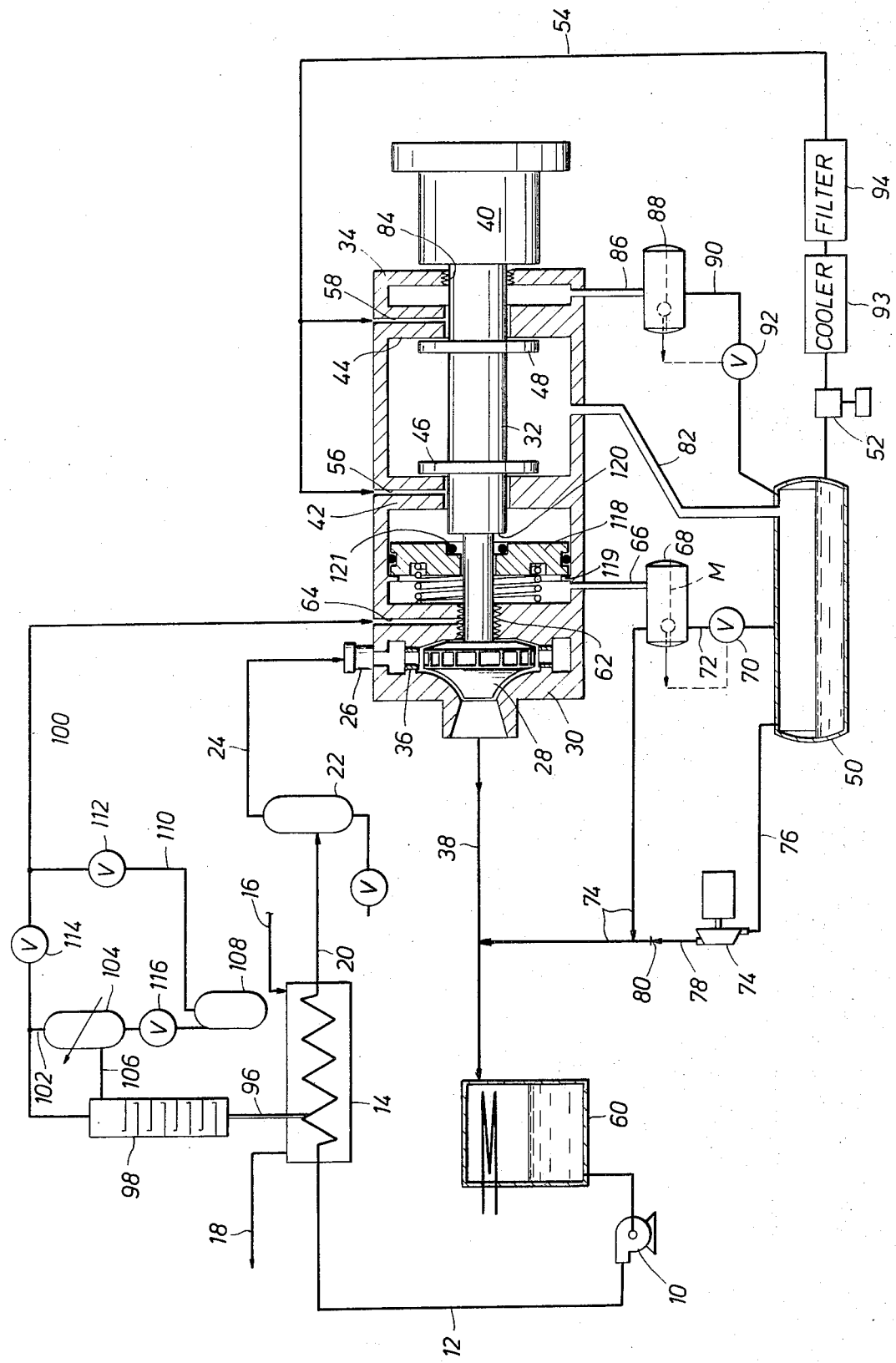

LUBRICATING AND SEALING SYSTEM FOR A ROTARY POWER PLANT

BACKGROUND OF THE INVENTION

1. Field of the Invention

The present invention pertains to power systems wherein a working fluid is heated and vaporized, for example by countercurrent heat exchange relation with hot water from an underground well. The working fluid is then expanded to do work, e.g. it is expanded in a turboexpander the rotor of which drives a shaft attached thereto. The rotor and shaft are enclosed in a housing, and the housing and shaft typically have mating radial bearings and thrust bearings.

Such bearings must be lubricated and the usual way of doing this is by injecting a lubricant under pressure into the bearings through a lubricant passageway in the housing. The lubricant flows through each bearing, axially and circumferentially along the shaft. It is then drained from the bottom of the housing to a reservoir from which it is pumped back through the bearings again. Thus a given quantity of lubricant is continually recycled through the system. Similarly, the working fluid is recycled; after expansion it is condensed and passed again through the heat exchanger.

There are several problems inherent in such systems particularly when the lubricant and the working fluid are chemically similar or are reactive with each other, or when one is soluble in the other. Since the preferred lubricants and the preferred working fluids are often comprised of hydrocarbons, such relationships are common. Two of the major problems in such cases are loss of working fluid and loss of lubricant viscosity and other properties or conversely losses of lubricant and contamination of the working fluid thereby.

The turboexpander must be sealed against atmosphere. This is generally accomplished by utilizing a seal around the shaft between the process zone, containing the working fluid and rotor, and the lubricant zone, containing the bearings and the remainder of the shaft. The seal must also serve to prevent the working fluid from leaking into the lubricant zone as this results in loss of working fluid and solution of the working fluid in the lubricant so as to reduce its viscosity or other necessary properties.

2. Description of the Prior Art

One previous method of sealing the process zone essentially utilized the bearing as a seal by pumping lubricant into the bearing with sufficient pressure that it would leak into the process zone and thereby seal the process zone against atmosphere while preventing leakage of working fluid into the lubricant zone. The major disadvantage of this system is that it requires a leakage of the lubricant, usually oil, into the process zone. Thus the lubricant must be separated from the working fluid and collected so that they can be respectively recycled. Additionally, the heavy constituents of the working fluid become dissolved in the lubricant, interfering with its lubricating properties and also depleting the amount of working fluid. This is most undesirable since only the slightest amount of working fluid loss is tolerable in such systems.

Other types of seals have been used. Many of them must be lubricated by oil which leaks into the process zone introducing problems similar to those described above. In any event, there has generally been danger of leakage in one direction or the other in prior art systems regardless of what type of sealing system was used.

SUMMARY OF THE INVENTION

In the power system of the present invention a labyrinth seal is disposed around the shaft between the process zone and the lubricant zone. A seal fluid, preferably a gas or vapor, is injected into the labyrinth seal at a sufficient pressure to prevent either the working fluid or the lubricant from leaking past the seal. The seal gas flows axially away from the seal in both directions and comes into contact with both the working fluid and the lubricant, and means are provided for recovering the seal gas from the working fluid and from the lubricant and recycling it through the seal.

The seal gas is non-reactive with the working fluid and with the lubricant and is substantially lighter and more volatile than the lubricant. Thus only a small amount of the seal gas dissolves in the lubricant. The seal gas and lubricant are drained from a mixing area in the housing between the seal and the bearing closest thereto and collected in a separating chamber where most of the seal gas is recovered at substantially the same pressure as that existing in the mixing area. The seal gas is usually at best partially condensed after recovery, so that this recovery of most of the seal gas at a relatively high pressure substantially lessens the amount of work needed to condense it. The lubricant is then directed into a reservoir maintained at approximately atmospheric pressure. The small amount of seal gas dissolved in the lubricant flashes at this point and is then recovered.

In a preferred form of the invention the working fluid is comprised of a mixture of constituents and is vaporized in a countercurrent heat exchanger rather than in a simple boiler. Such working fluids and systems utilizing them are more fully described in applicant's copending application, Ser. No. 321,810, filed Jan. 8, 1973. The different constituents boil at different points in the heat exchanger depending on their relative weights, the lightest constituents boiling at the lower temperatures. The seal gas in the preferred form of the invention is comprised of the lightest constituent of the working fluid and is sustantially free of the heavier constituents. Thus when the seal gas leaks from the seal into the process zone it is simply allowed to mix with or otherwise become entrained in the working fluid flowing out of the turboexpander. When the working fluid is passed again through the heat exchanger, the seal gas can be recovered by a tap in the heat exchanger at a location at which the major part of the vaporized portion of the working fluid is comprised of the lightest constituent.

It will be readily appreciated that because of the nature of the seal gas, i.e. because it is substantially lighter than the lubricant, is comprised of the lightest constituent of the working fluid and is substantially free of the heavier constituents of the working fluid, it is much more easily recovered from the lubricant than would be the heavier constituents were the lubricant and working fluid allowed to mix. It is also easily extracted from the working fluid. Additionally, it eliminates any danger of contamination of the working fluid and simplifies the system by virtue of the fact that it is actually part of the working fluid itself.

The preferred form of the invention also includes a seal fluid storage tank where a reserve of the seal fluid may be stored for use at start-up.

Accordingly one object of the invention is to provide a sealing system for a turboexpander which utilizes a seal fluid easily recoverable from both lubricant and working fluid.

Another object of the invention is to provide a sealing system using a seal fluid wherein most of the seal fluid is recovered from the lubricant and working fluid at a relatively high pressure.

An important object of the invention is to provide a power system whose working fluid is comprised of a mixture of constituents and wherein the lightest of the constituents is used as a seal gas.

Other objects and advantages of the instant invention will be made apparent by the following detailed description and the drawing.

BRIEF DESCRIPTION OF THE DRAWING

The FIGURE is a flow diagram of a seal power system according to the invention.

DESCRIPTION OF THE PREFERRED EMBODIMENT

Referring now to the drawing, there is shown a power system in which a pump 10 is used to drive a working fluid through line 12 and into a countercurrent type heat exchanger 14. The working fluid preferably consists of a mixture of constituent fluids such as hydrocarbons. The criteria for choosing the constituents of a working fluid of this type and for determining the proper proportion therefor is described in applicant's copending application, Ser. No. 321810 filed Jan. 8, 1973. To the extent that the disclosure of said application, Ser. No. 321810, is helpful in the understanding of the present invention, said disclosure is hereby expressly incorporated herein by reference.

As the working fluid passes through the heat exchanger 14, it is vaporized and perhaps superheated by a heating fluid passing countercurrent to the working fluid. The working fluid vaporizes over a range of temperatures, the lighter constituents boiling nearer the low temperature end of the heat exchanger and the heavier constituents boiling at the high temperature end. The heating fluid may be, for example, hot water from an underground well. The heating fluid enters the heat exchanger 14 at 16 and exits at 18. After passing through the heat exchanger 14, the water is considerably cooler and is usually returned to the ground by means of another well.

The vaporized working fluid leaving the heat exchanger at 20 passes through a scrubber 22 and thence through line 24 and into the inlet 26 of a turboexpander. The scrubber 22 serves to remove any unvaporized substance in the working fluid, e.g. lubricant which by misoperation has been introduced into the working fluid. The turboexpander comprises a rotor 28 enclosed by a rotor housing 30. Integrally attached to the rotor 28 is a shaft 32. The shaft 32 is enclosed by a shaft housing 34 which, in the embodiment shown, is formed integrally with the rotor housing 30. The working fluid is directed radially into the rotor 28 by nozzles 36, passes through the rotor 28, and exits in an axial direction through line 38. As the working fluid vapor passes through the rotor 28 it expands and turns the rotor which in turn rotates the shaft 32. The rotating shaft 32 does work as by driving some type of engine illustrated diagramatically at 40. The working fluid is then condensed by condenser 60 from which it is once again drawn into pump 10 and re-cycled.

The shaft 32 is supported in housing 34 by first and second bearing assemblies, 42 and 44 respectively. The annular, radially inner surfaces of bearing assemblies 42 and 44 serve as radial bearings to support the shaft 32. The opposed end surfaces of assemblies 42 and 44 cooperate with flanges 46 and 48 on the shaft 32 to form thrust bearings.

A lubricant oil from a reservoir 50 is driven by pump 52 through lubricant line 54 and injected under pressure into the bearing assemblies 42 and 44 through respective first and second lubricant passageways 56 and 58. The lubricant flows radially and axially along the shaft in both directions lubricating the bearings and then collects in the bottom of housing 34 from which it is directed back to reservoir 50 by means to be described more fully below.

In the rotor housing 30 is a labyrinth seal 62 surrounding the shaft 32 adjacent the rotor 28. The rotor housing 30, to the left of seal 62, defines a process zone containing working fluid; and the shaft housing 34, to the right of seal 62, defines a lubricant zone containing oil. The seal 62 separates these two zones. A seal fluid which is preferably a gas comprised of the lightest constituent of the working fluid, is injected under pressure into the seal 62 through seal passageway 64. The seal gas flows axially away from passageway 64 in both directions. The pressure of the seal gas in the passageway 64 and seal 62 is sufficiently greater than the pressures of the adjacent parts of the process zone and lubricant zone that it effectively seals the process zone against leakage to atmosphere and further prevents mixing of the working fluid and lubricant oil since neither the working fluid nor the oil can flow past the seal 62. Additionally, the pressure of the oil in first lubricant passageway 56 is greater than the pressures of the adjacent parts of the lubricant zone so as to prevent seal gas from flowing past the first bearing assembly 42. Thus the area in the housing between the seal 62 and the first bearing assembly 42 becomes a mixing area for seal gas and oil.

In setting up the system, the seal fluid must be chosen so as to be non-reactive with either the working fluid or the lubricant. It should preferably also be separable from the lubricant and the working fluid and substantially lighter and more volatile than the working fluid. In the preferred embodiment, as stated above, the seal fluid is comprised primarily of the lightest constituent or constituents of the working fluid and is substantially free of the heavier constituents. Thus it is substantially lighter and more volatile than the lubricant and tends not to dissolve in the lubricant in the mixing area. Rather it remains substantially in gaseous form while the oil is liquid even though the mixing area pressure is substantially greater than atmosphere.

A mixture vent and drain means 66 is provided in the bottom of the mixing area to drain lubricant oil and seal gas from the mixing area into a separating chamber 68. The drain 66 is wide enough to serve as a vent as well as a drain so that the pressure of the separating chamber 68 is substantially the same as that of the mixing area. A small amount of the seal gas dissolves in the mixing area and in the drain 66. However most of the seal gas is still in gaseous form when it reaches the separating chamber 68. In the separating chamber 68, the oil settles to the bottom of the chamber. A maximum depth level of lubricant, indicated by dotted line $m$, is maintained in the chamber 68 by a float control valve mechanism 70. When the depth of the lubricant in chamber 68 begins to rise above line $m$, a float in the chamber rises and operates a mechanism which opens the valve in lubricant conduit 72 leading from the bottom of the separating chamber 68 to the reservoir 50.

Most of the seal gas in chamber 68 is not in solution and rises to occupy the space above the line $m$. The seal fluid is removed from this space by means of a seal fluid conduit 74 leading from the top of chamber 68 to line 38. Line 38 serves as a seal fluid collecting duct where the seal gas, originally a part of the working fluid, rejoins the expanded working fluid exiting from the turboexpander. It will be readily appreciated that the relatively light volatile nature of the seal gas, whereby it is essentially self-separating from the lubricant at mixing area pressure is one of the main advantages of the invention and considerably reduces the amount of energy and equipment necessary to separate the seal gas from the lubricant.

The lubricant reservoir 50 is maintained at substantially atmospheric pressure so that almost all of the small amount of seal fluid which is dissolved in the lubricant flashes to its gaseous form in the reservoir 50 and collects in the upper part thereof. This seal gas is then drawn off through line 76 by compressor 74 which also serves to maintain reservoir 50 at substantially atmospheric pressure. The compressor 74 compresses the seal fluid to essentially the pressure of line 38. This seal gas is then directed into line 38 via line 78, one way valve 80 and line 74.

At this point only the smallest traces of seal gas remain in the lubricant in the bottom of reservoir 50. These traces are small enough not to represent a serious loss of the seal gas. These traces ordinarily would not seriously interfere with the viscosity of the oil. However by choosing a lubricant which is slightly more viscous than necessary, it becomes ideal in operation when the traces of seal gas are present.

Lubricant which flows to the portion of shaft housing 34 between the two bearing assemblies 62 and 64 flows through lubricant vent and drain means 82 into the reservoir 50. The portion of housing 34 opposite drain 82 is vented to atmosphere through labyrinth seal 84. Lubricant from this part of the shaft housing 34 is collected in auxiliary lubricant collecting means and also delivered to the reservoir 50. The auxiliary lubricant collecting means comprises drain 86, drum 88 and conduit 90, with conduit 90 being controlled by a float control valve mechanism 92. The purpose of the auxiliary lubricant collecting means and particularly of the valve 92 is to prevent air which may be present in the shaft housing 34 and seal gas in the lubricant reservoir 50 from mixing, as this could cause loss of seal gas, contamination of seal gas, and/or explosions. The oil in the bottom of reservoir 50 is substantially free of seal gas, except for the slight traces mentioned above, and is pressurized by pump 52 and driven through cooler 93, filter 94 and line 54 to the lubricant passageways 56 and 58.

The fluid which collects in the seal fluid collecting duct 38 is comprised of working fluid which has been expanded in the turboexpander and seal fluid which has been removed from chamber 68 and reservoir 50. These fluids, including the seal gas, may simply be considered the "working fluid" at this point since the seal gas is actually comprised of one of the constituents of the working fluid. The condenser 60, pump 10 and line 12 comprise a working fluid line which liquefies the working fluid in duct 38 and directs it back through heat exchanger 14.

In order to recover the seal fluid from the working fluid, a tap 96 is located in the heat exchanger 14 at a point at which the major part of the vaporized portion of the working fluid being heated is comprised of the very lightest constituent or constituents of the working fluid, i.e. that constituent which is to be used for seal fluid. It will be understood that the tap 96 would be sized so as to allow the proper amount of the lightest constituent to escape and that some of this constituent will probably remain in the working fluid. Accordingly, in preparing the working fluid, it is necessary to take into consideration the fact that some of this lightest constituent will be extracted from the working fluid and used as seal gas. Thus the formula for the working fluid will have to include a proper amount of the lightest constituent so as to provide the desired amount of seal fluid and leave the remainder of the working fluid with the desired composition after the extraction of the seal fluid. The tap 96 is connected to the bottom of a fractionating tower 98 and is also sized to allow reflux from the bottom of tower 98 to flow therethrough by gravity into the heat exchanger 14 against the stream of seal gas in tap 96. The seal gas flows upwardly through the tower 98 and is further stripped of the heavier constituents of the working fluid and other impurities by a reflux fluid flowing downwardly through the tower. The seal gas emerging from the top of tower 98 is thus substantially free of the heavier constituents of the working fluid, i.e. any traces of the heavy constituents are so slight as to represent negligible interference with the properties of the lubricant when the two are mixed in the mixing area. The seal gas then passes through seal fluid line 100 to the seal passageway 64. The seal fluid line 100 has a segment 102 which directs some of the seal fluid into a condenser 104 where it is liquefied. A portion of this liquefied seal fluid is directed to the top of the fractionating tower 98 by reflux line 106 and is used as the reflux fluid for the tower. Another portion of the liquefied seal fluid from condenser 104 is stored in a seal fluid storage tank 108. This stored seal fluid is used as a reserve and can be released into seal fluid line 100 through reserve line 110 connected downstream of the condenser 104 to provide the necessary seal during start-up of the system.

A valve 112 in reserve line 110 may be operated either manually or automatically to open reserve line 110 during start-up and to close the line 110 when sufficient seal gas is being released from the fractionating tower 98. Similar valves 114 and 116 can be used at shutdown to respectively close line 100 upstream of line 110 and the passageway between the condenser 104 and the tank 108.

In order to prevent loss of seal fluid or working fluid during shutdown of the system, a seal off valve 118 is provided. During operation of the system the seal off valve 118 remains in the position shown. At shutdown, it is moved to the right so that o-ring 121 bears against a shoulder 120 on the shaft 32 so that no fluid from the mixing area can leak past the shoulder. Valve 118 can be operated mechanically or it can be operated automatically by virtue of the fact that at shutdown the pressure in lubricant passageway 56 drops so that the pressure in the mixing area is operative to push the valve 118 to the right and into engagement with shoulder 120. The liquid trapped in chamber 68 and the check valve 80 together prevent any bypass around the seal of valve 118. Stop 119 prevents valve 118 from blocking mixture vent and drain means 66 during operation.

I claim:

1. In a system of the type wherein a working fluid comprising a plurality of constituents is passed through a rotary machine, wherein said machine comprises a rotor housing, a rotor within said rotor housing integrally connected to and, in operation, rotating with a shaft on a common axis of rotation, wherein said shaft extends from said rotor housing and is supported by a first bearing assembly externally of the rotor housing, and wherein a lubricant is injected under pressure into said first bearing assembly and caused to flow through the first bearing assembly around said shaft and therefrom axially toward said rotor: the improvement which comprises a labyrinth seal in said rotor housing surrounding a portion of said shaft adjacent said rotor for sealing said rotor housing around said shaft, said rotor housing having a seal fluid passageway therethrough for injecting a seal fluid into said seal around said shaft intermediate the axial extremities of the seal, said seal fluid comprising one of the constituents of said working fluid and being non-reactive with said working fluid and said lubricant, the interior of said rotor housing defining a process zone on one side of said seal containing said working fluid under a working pressure lower than said seal fluid as injected, a shaft housing enclosing said shaft adjacent said seal and defining a lubricant zone on the other side of said seal, said lubricant zone including a mixing area between said seal and said first bearing assembly and maintained under pressure lower than the pressure of said seal fluid passageway, whereby said seal fluid will leak into both said process zone and said mixing area and will prevent intermingling of said working fluid and said lubricant.

2. A system according to claim 1 wherein said seal fluid is separable from said working fluid and said lubricant, said system further including means for recovering said seal fluid from said lubricant and from said working fluid and for recycling said seal fluid through said labyrinth seal.

3. A system according to claim 2 wherein the pressure in said first bearing assembly is higher than the adjacent pressures in said lubricant zone whereby said seal fluid is prevented from flowing axially past said first bearing assembly, said seal fluid is substantially more volatile than said lubricant, and the pressure of said mixing area is such that said seal fluid is in a gaseous state and said lubricant is in a liquid state at said mixing area pressure.

4. A system according to claim 3 including a separating chamber, mixture vent and drain means connecting said mixing area with said separating chamber such that said lubricant and said seal fluid can flow from said mixing area into said separating chamber, said separating chamber being maintained at substantially the same pressure as said mixing area, means for limiting the level of said lubricant in said separating chamber to a predetermined level less than the full volume of said separating chamber, whereby the major portion of said seal fluid separates from said lubricant in said separating chamber and occupies the space above said maximum depth level in said separating chamber, and means for removing said seal fluid from said space.

5. A system according to claim 4 further comprising a lubricant reservoir, a lubricant conduit connecting said lubricant reservoir to said separating chamber below said maximum depth level, and means for selectively opening said conduit when said lubricant tends to rise above said maximum depth level to allow flow of lubricant from said separating chamber to said lubricant reservoir, wherein the pressure in said lubricant reservoir is substantially lower than the pressure in said separating chamber whereby any of said seal fluid which is contained in liquid form in the lubricant flowing through said lubricant conduit flashes to a gaseous state in said lubricant reservoir and collects in an upper part of said reservoir, said system further comprising means for drawing said seal fluid from the upper part of said reservoir.

6. A system according to claim 4 wherein said seal fluid removing means comprises a seal fluid conduit connecting said space above said maximum depth level in said separating chamber with a seal fluid collecting duct of lower pressure than the pressure in said separating chamber.

7. A system according to claim 5 wherein said seal fluid removing means comprises a seal fluid conduit connecting said space above said maximum depth level in said separating chamber with a seal fluid collecting duct of lower pressure than the pressure in said separating chamber but greater than the pressure in said lubricant reservoir, and wherein said seal fluid drawing means comprises a compressor operative to draw said seal fluid from said upper part of said reservoir and direct said seal fluid into said seal fluid collecting duct while increasing the pressure of said seal fluid from that of said reservoir to that of said duct.

8. A system according to claim 1 wherein said seal gas is comprised of a lightest one of said constituents and is substantially free of the heavier ones of said constituents.

9. A system according to claim 6 wherein said rotary machine is a turboexpander operative to expand said working fluid and said seal is comprised of a lightest one of said constituents and is substantially free of the heavier ones of said constituents, and wherein said seal fluid collecting duct is in equal pressure communication with the outlet of said turboexpander.

10. A system according to claim 8 wherein said rotary machine is a turboexpander operative to expand said working fluid, said system further including a countercurrent heat exchanger for vaporizing said working fluid, feed means for feeding said vaporized working fluid into the inlet of said turboexpander, said heat exchanger having tap means located at a point in said heat exchanger at which a major part of a vaporized portion of the working fluid is comprised of said lightest constituent, said tap means allowing escape of said vaporized portion and a seal fluid line communicatively connecting said tap means with said seal fluid passageway.

11. A system according to claim 10 wherein said seal fluid line includes a seal fluid condenser between said tap means and said seal fluid passageway for liquefying at least a fraction of the vaporized portion of said working fluid escaping through said tap means.

12. A system according to claim 11 further including a seal fluid storage tank connected to said seal fluid condenser for storing a quantity of said liquefied fraction to serve as a seal fluid reserve.

13. A system according to claim 12 further including a reserve line connecting said seal fluid storage tank to said seal fluid line downstream of said seal fluid condenser, and valve means in said reserve line operative to open and close said reserve line.

14. A system according to claim 11 further including a fractionating tower in said seal fluid line immediately adjacent said tap means and having its lower end connected to said tap means, a reflux line connecting a liquid containing portion of said seal fluid condenser to the upper end of said fractionating tower, and wherein a segment of said seal fluid line further connects the upper end of said fractionating tower to a vapor containing portion of said seal fluid condenser.

15. A system according to claim 5 wherein said shaft housing has lubricant vent and drain means adjacent said first bearing assembly opposite said mixing area and leading to said reservoir.

16. A system according to claim 15 including a second bearing assembly supporting said shaft, said lubricant vent and drain means being located between said bearing assemblies.

17. A system according to claim 16 wherein said shaft housing has a vent located adjacent said second bearing assembly opposite said lubricant vent and drain means, said system further including auxiliary lubricant collection means between said second bearing assembly and said vent and connected to said reservoir for collecting said lubricant and returning it to said reservoir and having a control valve mechanism operative to substantially prevent exchange of gases between said reservoir and said shaft housing through said auxiliary lubricant collection means.

18. A system according to claim 9 including a countercurrent heat exchanger for vaporizing said working fluid, a working fluid line connecting said duct and said outlet end of said turboexpander to a cool end of said heat exchanger, said working fluid line including a working fluid condenser for liquefying said seal fluid and the working fluid flowing from the outlet end of said turboexpander; and a working fluid pump for directing said working fluid, including said seal fluid, through said working fluid line to said cool end of said heat exchanger.

19. A system according to claim 1 wherein said rotary machine is a turboexpander operative to expand said working fluid and thereby drive said shaft.

* * * * *